INVENTORS.
Johnnie D. Laman
Glenn Roy Wessels
BY Earl D. Ayers
AGENT

United States Patent Office 3,558,277
Patented Jan. 26, 1971

---

3,558,277
METHOD OF MONITORING THE AMOUNT OF BIODEGRADABLE ORGANICS IN LIQUID
Johnnie D. Laman and Glenn R. Wessels, Lake Jackson, Tex., assignors to The Dow Chemical Company, Midland, Mich., a corporation of Delaware
Filed Dec. 7, 1967, Ser. No. 688,881
Int. Cl. G01n *31/02, 33/18*
U.S. Cl. 23—230
8 Claims

ABSTRACT OF THE DISCLOSURE

Method for continuously monitoring the amount of biodegradable organics in aqueous material, comprising adding caustic to precipitate any magnesium, calcium, copper or iron that may be present, filtering or otherwise separating out the precipitate, adding a permanganate solution (usually potassium permanganate) to the filtrate (precipitate free material), passing the filtrate through the sample cell of a colorimeter, and measuring the color change (in millivolts) on a continuous recorder as a function of the amount of biodegradable material in the aqueous sample being tested. This method is especially useful in determining the chemical oxygen demand in waste water streams, and performs such measurement in less than one hour as compared to a matter of 6–8 hours or more for other known methods.

BACKGROUND OF THE INVENTION

Figure 1:
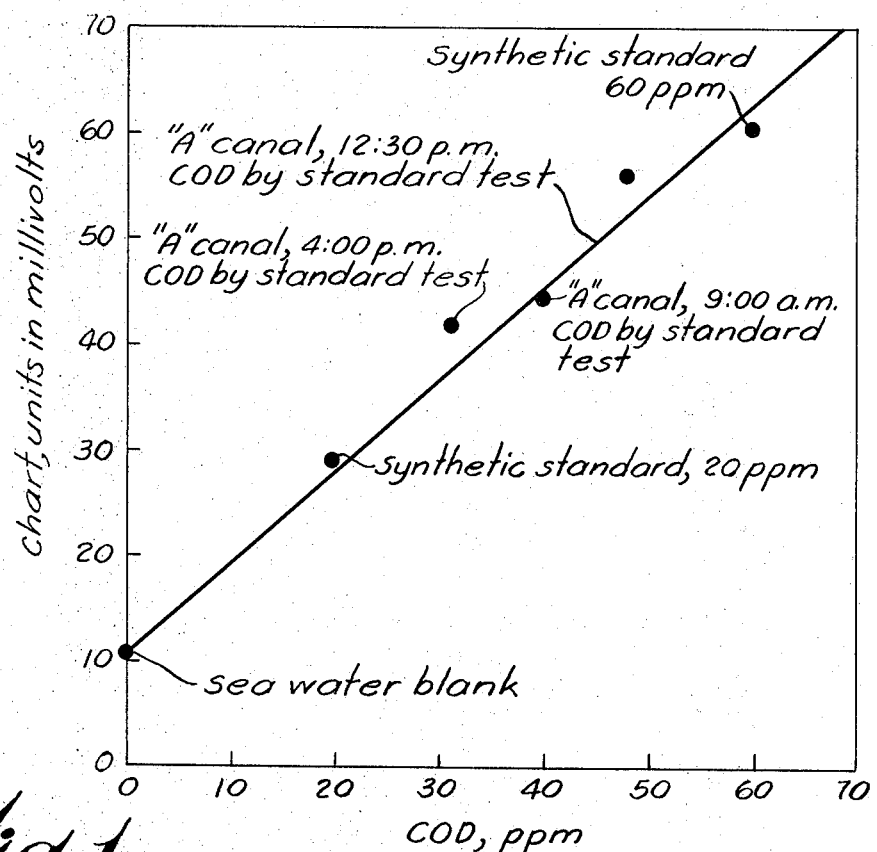

This invention relates to a method of determining the amount of biodegradable organic material in a liquid, and particularly to a method for continuously monitoring the amount of biodegradable organic material in an aqueous stream.

The contamination of rivers, streams, lakes, and other bodies of water by organic matter is an increasing problem and is of considerable interest to the public and to industry. Various means have been devised for determining the extent of contamination. The most accurate methods so far devised require intermittent sampling and each sampling generally requires several hours (in some methods, days) before the analysis is completed. During the interval between samplings, it is possible for gross amounts of organic contaminants to pass by the sample point so that by the time another sample is taken, the water is "back to normal" and the portion of water which contains the large amount of contaminants goes undetected. Various continuous monitoring methods have been tested, but so far, no feasible method has been available which will quickly and continuously determine the amount of oxidizable organics in a stream.

Several years ago it was generally believed that if only biodegradable organics were put into a body of water, that bacteria would consume the organics and thereby "remove" them as contaminants. Subsequent studies have shown that if the concentration of the biodegradable organics is high enough, the bacteria will deplete the oxygen in the water during their consumption of the organics. The oxygen-depleted water will fail to sustain animal life and the water becomes even more seriously contaminated.

Various methods were devised for measuring the biochemical oxygen demand (B.O.D.) of water contaminated with biodegradable organics. One such method requires taking a sample of the water and incubating it (in a closed container) until the bacteria have consumed all the organics they can, then measuring the amount of oxygen used up by the bacteria. It is generally believed that in about 20 days, the bacteria will have consumed all the organics which require oxygen during consumption, assuming there was enough oxygen in the water to allow them to consume all the biodegradable organics.

In an article titled "Graphical Determination of B.O.D. Curve Constants" by Harold A. Thomas, pp. 123–124, Water and Sewage Works, March 1950, a method was set forth which allows one to compute the ultimate B.O.D. from B.O.D. tests of only 5 days. While the B.O.D. measurements are widely employed, they require tests of several days duration. Some attempts have been made to run accelerated B.O.D. determinations in a few hours, but environmental conditions limit the accuracy of this method.

Chemical oxygen demand (C.O.D.) has been determined in the past by employing potassium dichromate as an oxidizer. The dichromate reacts with the biodegradable organics in the water and the amount of dichromate used in the reaction is determined by titration. The method is farily rapid but the dichromate will also react with organics which are not biodegradable and the determination does not always correspond to the true ultimate B.O.D. The method also exhibits chloride interference.

Accordingly, a principal object of this invention is to provide an improved method for continuously determining the amount of biodegradable organic material in a liquid.

Another object of this invention is to provide an improvided method of determining, on a continuous basis, the amount of biodegradable material in an aqueous stream.

In accordance with this invention, a portion of the water to be tested is treated with caustic in an amount sufficient to cause precipitation of any magnesium, calcium, copper or iron that may be in the liquid (usually water); there should be enough caustic left over from the precipitation of the metals to cause the water to be highly alkaline. The precipitate (if any) is filtered or otherwise removed from the liquid (water) and the liquid (water) is then contacted with a metered amount of potassium (for example) permanganate solution. The liquid (water) is then passed through a heated coil of sufficient length and temperature to give a residence time which is sufficient to effect complete reaction of the permanganate with essentially only the biodegradable organics. The permanganate undergoes a color change which is correlatable to the extent which the permanganate has reacted and the color change is measured in a colorimeter and thereby recorded on a continuous recorder. The reading (millivolts) on the recorder is a function of chemical oxygen demand in parts per million and may be read as such on the recorder chart or by reference to another chart used to convert the millivolt reading to p.p.m. C.O.D. (chemical oxygen demand).

Figure 2:
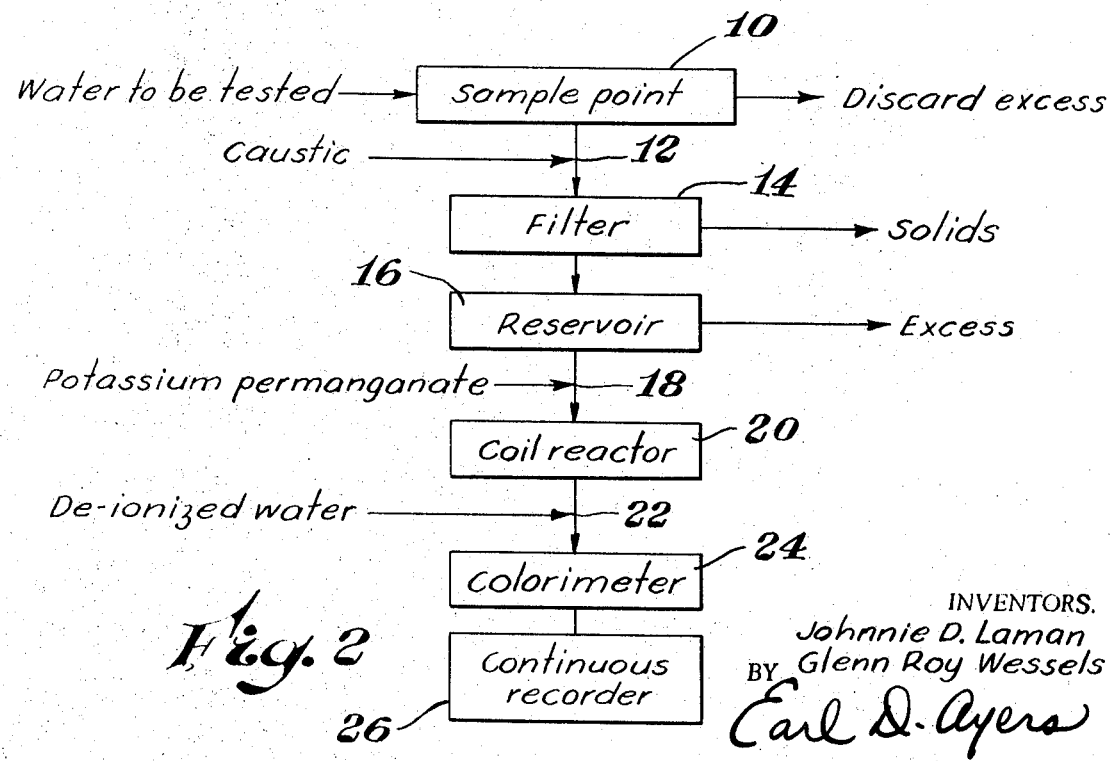

The invention, as well as additional objects and advantages thereof, may best be understood when the following detailed description is read in connection with the accompanying drawing, in which:

FIG. 1 is a chart showing chemical oxygen demand in parts per million correlated with the reading, in millivolts, achieved in accordance with this invention, and FIG. 2 is a flow chart illustrating apparatus used in carrying out the method of this invention.

FIG. 1 is a chart prepared for testing the water in a waste seawater canal into which organic materials are often passed. A sample of "normal" seawater and two synthetically prepared samples of "contaminated" seawater were analyzed by the instant process to obtain millivolt readings on the recorder. By plotting these points on a chart, a straight line relationship was found for millivolt units vs. p.p.m. C.O.D. Measurements of actual contaminated seawater (Dow Canal A) obtained by the instant process were made by taking the millivolt readings (obtained by measuring the color change of the permanganate) and applying them to the graph shown as FIG. 1 and finding the corresponding p.p.m. C.O.D. The p.p.m. C.O.D. thus measured was found to have a direct relationship to the ultimate biodegradable oxygen demand determined by above-described standard techniques.

The testing was performed by continuously combining metered amounts of raw sample and 1–2 NaOH solution. The resulting precipitate was filtered out and the filtrate was continuously combined with 0.5 N $KMnO_4$ and pumped through a coil in a heated bath (80° C.) where the residence time was about 30–40 minutes. The sample was then continuously combined with 20 times its volume of deionized water and was then passed through the sample cell of a Klett Colorimeter equipped with a 660 millimicron filter. The light intensity passing through the sample was continuously recorded on a Leeds and Northrup 5 MV recorder.

The mechanics of the above-described process were aided by using a Technicon tubing pump. The pump is designed to pump liquids through several plastic tubes simultaneously. Each tube is calibrated by size to deliver a fixed volume of liquid per time interval of pumping. Thus, each of the liquid flows was handled by one pump and the volume ratio of any two flows was held constant. The mechanics were further aided by using small in-line mixing devices at points immediately downstream from the places where the caustic, the permanganate, and the deionized water were added. The mixers assured constant thorough mixing of the ingredients. The in-line mixers were comprised of small teflon-covered magnetic stirring bars encased in plastic chambers through which the respective flows were passed. A standard type magnetic stirrer was used to keep the stirring bars in motion.

Thus, as shown in FIG. 2, the liquid to be tested, usually water, is flowed past a sample point 10, the sample stream then having a caustic (sodium hydroxide, usually) solution metered into it, as at 12, in an amount in excess of that required to precipitate any magnesium, calcium, copper or iron in the liquid (usually water), with the sample stream and caustic being mixed together. The mixed caustic and sample stream passes through a filter 14 where solids are removed. The filtrate then passes into a small reservoir 16 (not essential to the method) from which excess filtrate is removed. A metered amount of filtrate is then combined with a metered amount of permanganate solution (usually .5 N $KMnO_4$) at 18 and is mixed together.

The mixture then passes through a reactor 20, usually a coil, with enough residence time in the reactor to effect complete reaction of the permanganate solution with essentially only the biodegradable organics in the filtrate.

The output stream from the reactor 20 is then diluted as at 22 with essentially pure water (usually deionized) and passed through a colorimeter 24 whose output is shown on a continuous recorder 26.

As mentioned above, it has been found that the C.O.D. of a body of water can be continuously monitored by employing the instant invention, and that the C.O.D. (chemical oxygen demand) determinations of the instant invention show a consistent relationship to the ultimate B.O.D. (biological oxygen demand) measurements when determined as described above. The oxidizer used (usually potassium permanganate) in this invention reacts with essentially the same organics that bacteria will consume and does not react with all the organics that dichromate will react with, thus will give a more accurate indication of the B.O.D. than will the dichromate method.

The operative limits of the method of this invention will depend on whether the water being tested is highly or slightly contaminated or is subject to wide variation. The blanks or controls used to establish the conversion graph (e.g. FIG. 1) for a given stream of water should be done at the same conditions as the actual tests which follow. If one changes the amount of caustic being added or the amount of permanganate being added, a new graph should be prepared. Also, the residence time and temperature in the coil reactor should be held constant.

The type of base material, the particular oxidizer, the flow rates, the Klett filter, and the calibration of the recorder must also be held constant throughout the testing of the control samples and the actual samples.

Any body of water, for example, may be monitored in accordance with this invention; lakes, rivers, oceans, canals, or water from heat exchangers, chemical process effluent, or even as a leak detector if organics are escaping from process equipment. Sodium permanganate or ammonium permanganate may be substituted for the potassium permanganate, or mixtures of these permanganates may be used. Potassium hydroxide or ammonium hydroxide may be used as a substitute for sodium hydroxide, or mixtures of these hydroxides may be used.

What is claimed is:

1. A method of monitoring the amount of biodegradable organic material in a liquid, comprising
  (A) withdrawing a metered amount of sample stream from said liquid;
  (B) adding a metered amount of material from the group consisting of alkali metal hydroxide and ammonium hydroxide to said sample stream, said metered amount being substantially in excess of the amount needed to precipitate any magnesium, calcium, copper or iron in the liquid;
  (C) mixing said sample stream and said metered amount of material from the group consisting of alkali metal hydroxide and ammonium hydroxide;
  (D) separating any precipitate from said sample stream and said metered amount of material;
  (E) mixing the precipitate-free sample stream and metered amount of liquid with a metered amount of permanganate solution from the group consisting of alkali metal permanganates and ammonium permanganate;
  (F) maintaining said precipitate-free sample stream and metered amount of liquid and said permanganate solution at a temperature and for a time sufficient to effect substantially complete reaction of the permanganate solution with essentially only the biodegradable organics in said precipitate-free sample stream and metered amount of liquid-permanganate solution mixture; and
  (G) then deriving an output signal which is a function of the color of said precipitate-free sample stream and metered amount of liquid-permanganate mixture.

2. A method in accordance with claim 1, wherein a metered amount of diluent liquid is mixed with said precipitate-free sample stream and metered amount of liquid-permanganate solution mixture just prior to said signal being derived, said diluent being proportional to the volume of said precipitate-free sample stream and metered amount of liquid-permanganate solution mixture.

3. A method in accordance with claim 1, wherein said liquid containing biodegradable material is an aqueous liquid.

4. A method in accordance with claim 2, wherein said diluent liquid is deionized water.

5. A method in accordance with claim 1, wherein the material from said group consisting of alkali metal hydroxide and ammonium hydroxide is a sodium hydroxide solution.

6. A method in accordance with claim 1, wherein the permanganate solution from the group consisting of alkali metal permanganates and ammonium permanganate is potassium permanganate.

7. A method in accordance with claim 1, wherein said sample stream material from the group consisting of alkali metal hydroxide and ammonium hydroxide, and permanganate solution are in substantially constant predetermined volumetric relationship with each other.

8. A method in accordance with claim 1, wherein said derived signal is recorded.

References Cited

UNITED STATES PATENTS 3,322,504  5/1967  Capuano _____ 23—230

OTHER REFERENCES

Ingols et al.: "Measuring the Strength of Sewages and Trade-Waste. B.O.D. or O.C.D.," Water and Sewage Works, vol. 97, pp. 21–27 (January 1950).

Rhame: "B.O.D. or C.O.D.—A Commentary," Water and Sewage Works, vol. 97, pp. 179–181 (April 1950).

Analytical Abstracts, vol. 1, Abs. 1696 (1954).

Analytical Abstracts, vol. 11, Abs. 1523 (1964).

JOSEPH SCOVRONEK, Primary Examiner